United States Patent [19]

Neilsen et al.

[11] Patent Number: 4,944,139
[45] Date of Patent: Jul. 31, 1990

[54] STRAPPER STOP APPARATUS

[75] Inventors: Robert F. Neilsen; Peter Hiebert, both of Birmingham, Ala.

[73] Assignee: Neilsen & Hiebert Systems, Inc., Birmingham, Ala.

[21] Appl. No.: 252,772

[22] Filed: Oct. 3, 1988

[51] Int. Cl.$^5$ .................... B65B 13/06; B65B 57/16
[52] U.S. Cl. .................................. 53/599; 53/55; 53/74; 53/589
[58] Field of Search ............... 53/399, 494, 582, 589, 53/74; 100/14; 198/855, 463.4, 463.6

[56] References Cited

U.S. PATENT DOCUMENTS

| | | | |
|---|---|---|---|
| 2,503,812 | 4/1950 | Fath | 198/855 |
| 2,818,795 | 1/1958 | Gustafson | 100/14 |
| 3,355,856 | 12/1967 | Randrup | 198/463.6 X |
| 4,168,611 | 9/1979 | Woyton | 198/855 |
| 4,262,587 | 9/1981 | Russell | 53/589 |
| 4,487,309 | 12/1984 | Dorner | 198/463.4 |

FOREIGN PATENT DOCUMENTS 1624   1/1988   Japan ........................... 198/855

Primary Examiner—John Sipos
Attorney, Agent, or Firm—Jennings, Carter, Thompson & Veal

[57] ABSTRACT

An improved positioning apparatus for conveyor systems uses a pair of retractable stops mounted laterally of the conveyor belt to extend diagonally over the belt and engage an article thereon at a precisely repeatable point. The conveyor drive is augmented by auxiliary drive means which are engaged to urge the article against the stops and to prevent excessive shock in the system.

13 Claims, 4 Drawing Sheets

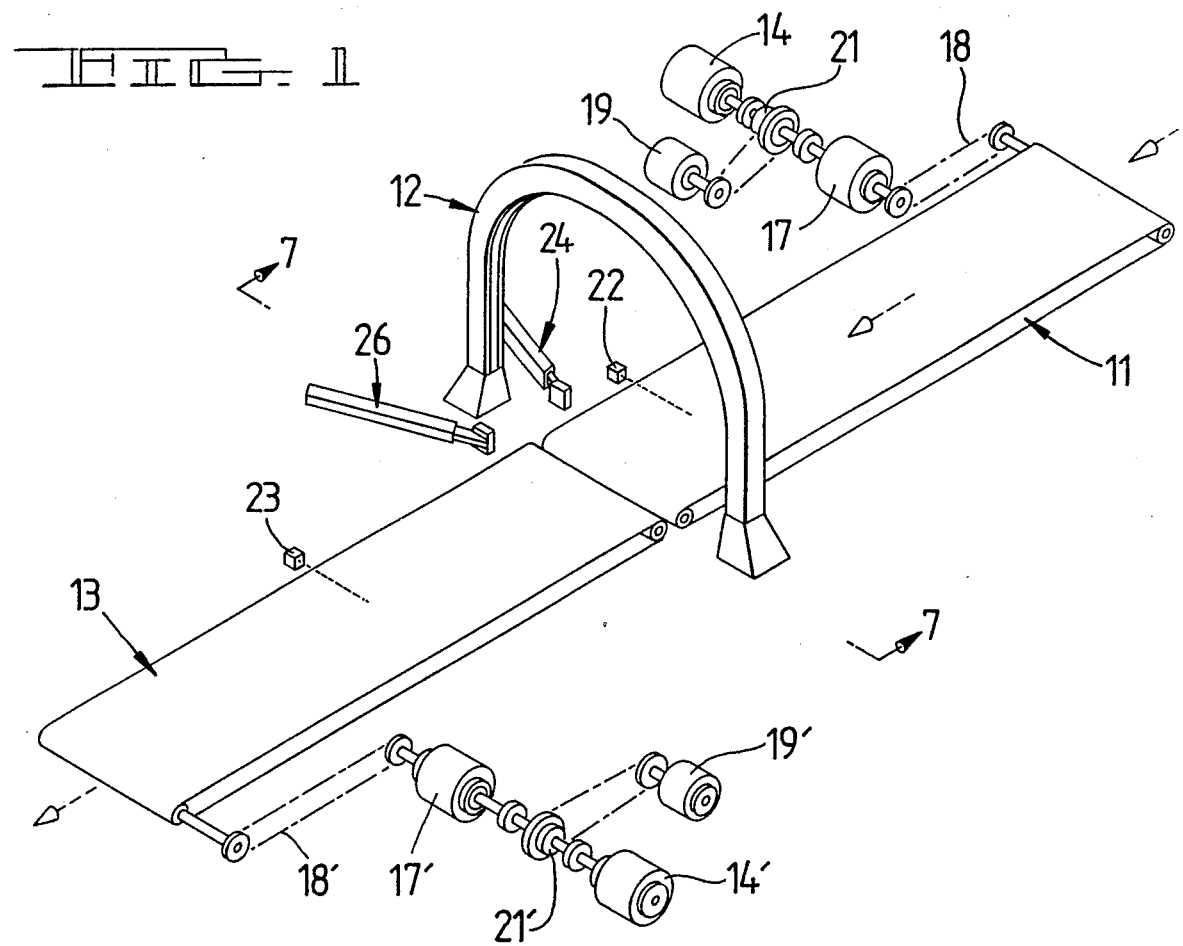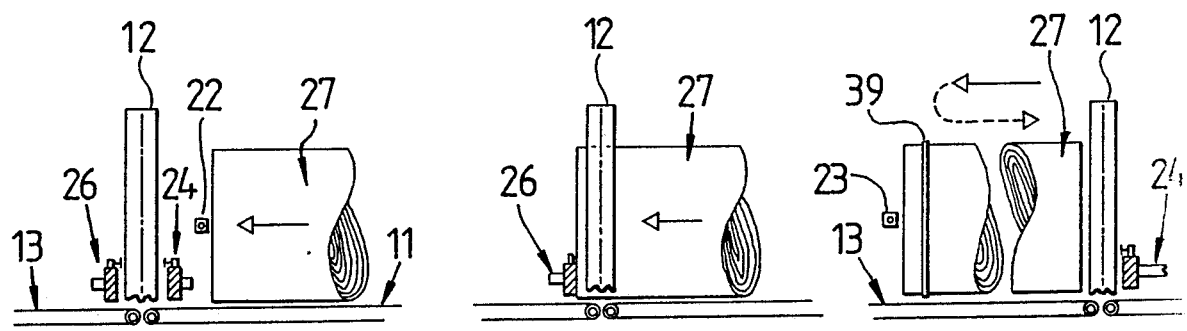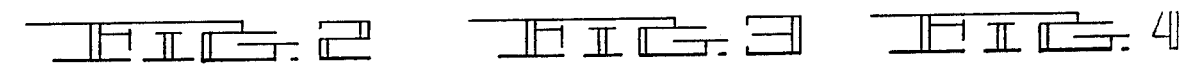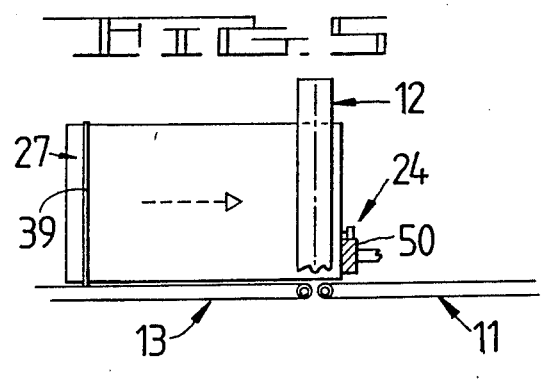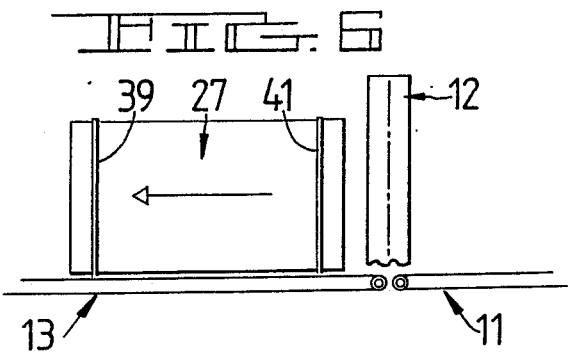

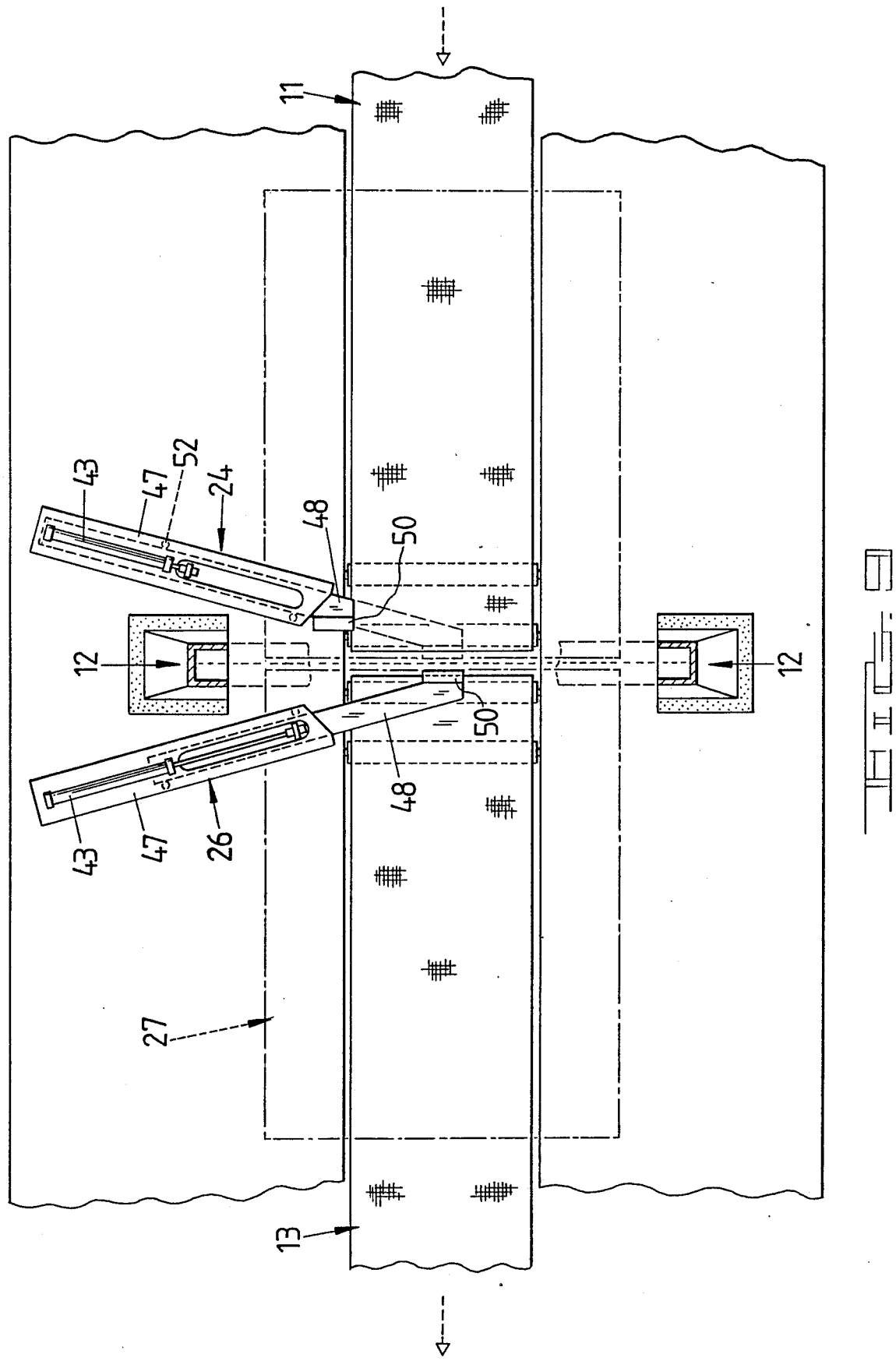

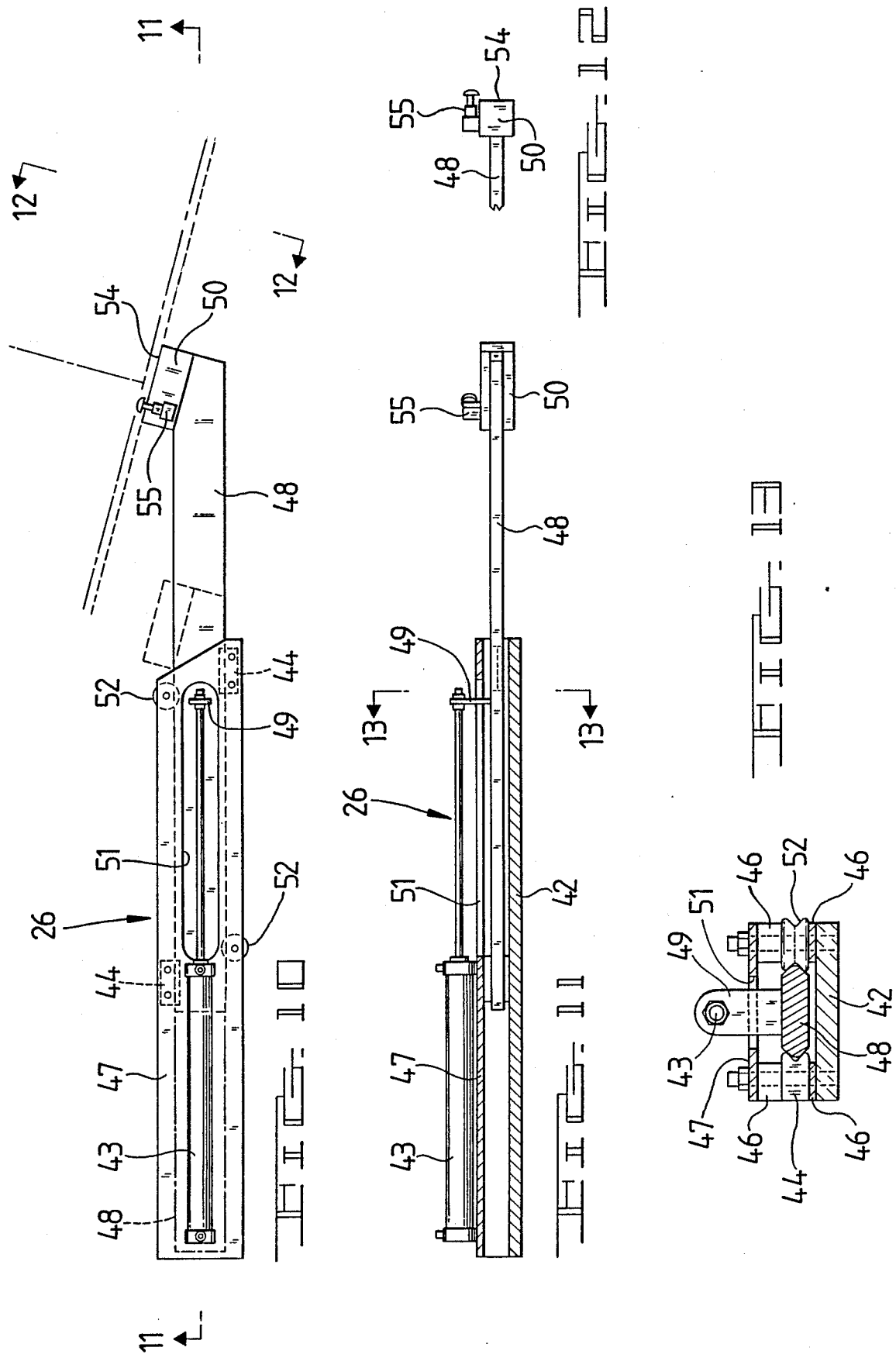

STRAPPER STOP APPARATUS

Field of the invention

The present invention relates to conveyor equipment generally and in particular to conveyor equipment wherein articles carried on the conveyor are acted on at various processing stations. For example, the article may be strapped or stamped at a particular processing station; thus the article may need to be accurately located relative to the processing station. Specifically, the invention relates to paper roll processing.

Background

In the packaging industry large rolls of corrugated paper are formed in mills and the like and are shipped in roll form or stored in roll form until the material is fabricated into packaging. These rolls are quite large, measuring several feet in diameter and from one foot to several feet in length. Each roll is placed on a conveyor system which moves the roll axially through a strapping apparatus which applies a band proximal each end of the roll to secure the paper for shipping or storage. Improper strapping, that is strapping which is not properly positioned on the roll results in transit damage to the outside of the roll and can constitute a hazard if the roll were able to unroll in a fire situation. Thus as a matter of economics and as a matter of safety accurate strapping apparatus is needed.

Conventional conveyor systems have utilized a pair of electrical motor driven conveyors to deliver and remove the articles from the strapping station. Traditionally, electric motor brakes have been used to retard the movement of the articles and in some instances extendable band guides, which are located intermediate the conveyors, have been used to stop the articles. Obviously such procedures only provide gross alignment of the paper rolls with the strapping apparatus and consequently loose paper and telescoping layers on such rolls have presented a very real problem.

Summary of the Invention

It is the object of the present invention to precisely position the edge of a roll of paper or similar article relative to a strap line or other processing apparatus.

Yet another object of the invention is to reduce shock and equipment wear in a stop/start conveyor system.

Still another object of our invention is to enable higher speed conveyor operation, thus yielding higher processing rates.

Another object of the invention is to enable the processing unit to handle articles of various lengths.

Still another object is to provide a system which can be readily adjusted to vary the placement of an article relative to a reference line.

These and other objects and advantages may be efficiently accomplished in our invention due to its novel combination of features which allow us to retrofit existing conveyor units in a very short time with minimal interruption of the equipment or normal operation thereof. Our invention utilizes a pair of opposing retractable stop members located on the upstream and downstream side of a reference line such as the strap line of a band strapping machine. Each of the stops mentioned are mounted to the floor or other available structure laterally of the conveyor and have an extendable arm which moves in a horizontal plane at a predetermined height along a line diagonally across the conveyor. Each arm carries a contact block which engages the article when the arm is fully extended. Extension of the arms is controlled by a set of limit switches which sense the position of the article on the conveyor and also actuate an auxiliary drive system. The auxiliary drive system includes an air motor and an air clutch positioned to transfer conveyor drive between the electric motor drIve and the air motor. The aIr motor operates at a slower speed and gently delivers the article against the contact block.

Brief Description of the Drawings

Apparatus embodying features of my invention are depicted in the accompanying drawings which form a portion of this disclosure and wherein:

FIG. 1 is a perspective pictorial schematic view of our invention installed on a strapping conveyor.

FIG. 2-6 are side elevational views depicting the progress of a roll of paper through a strapper apparatus using our invention.

FIG. 9 is a view taken on line 8—8 of FIG. 7.

FIG. 10 is a plan view of one of the extendable stop members.

FIG. 11 is a side elevational view of the stop member shown in FIG. 10.

FIG. 13 is a sectional view taken along line 13—13 of FIG. 11.

FIG. 12 is a detail view of the contact block assembly.

Description of a Preferred Embodiment

Figure 7:
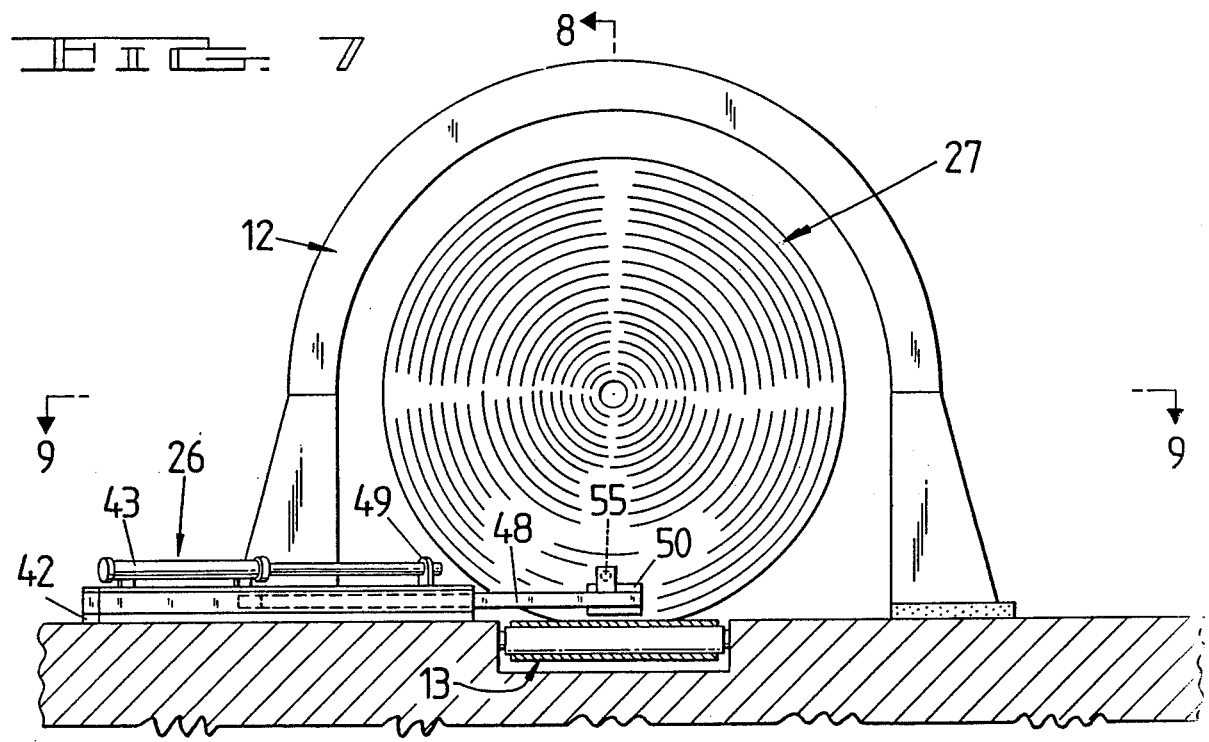
FIG. 7 is a view taken along line 7—7 of FIG. 1.

Referring to the drawings for a more complete understanding of our invention, note that in FIG. 1 an input conveyor 11 is positioned to deliver an article to a strapper device 12 and a discharge conveyor 13 is positioned to remove the article therefrom. Conventional electric motors 4 and 14' are used to drive the conveyors 11 and 13 through reducer 17, 17' and chain drives 18, 18". We have modified this drive arrangement by adding air motors 19 and 19' and air clutches 21, 21", such that the conveyors 11 and 13 can be selectively driven electrically or pneumatically. The electric motors 14, 14' normally drive the conveyor at a rate of about fifty feet per minute whereas the air motor 19, 19' drives the conveyor at about eight feet per minute. A proximity switch 22 located upstream from the strapper 12 detects the position of an article on the conveyor at a predetermined point and causes the actuation of the air clutch 21 to transfer drive to the air motor 19. A similar proximity switch 23 performs a like function with respect to the output conveyor 13. The proximity switches 22, 23 also control a pair of retractable stop assemblies 24 and 26.

With reference to FIGS. 2-6 the sequence of moving an article through our invention will be described. In FIG. 2 input conveyor 11, driven by electric motor 14 is delivering a roll of paper 27 to the strapper apparatus 12. In FIG. 3, air motor 19 has taken over the drive function and delivered the roll 27 into the strapper 12 and against the extended stop assembly 26. In FIG. 4, the electric motors 19, 19' have cooperatively moved the roll through the strapper 12 to proximity switch 23 at which point air motor 19' reverses the direction of conveyor 13. In FIG. 5, the roll 27 has been urged against the extended stop assembly 24, and in FIG. 6 the output conveyor 13 driven by electric motor 14' removes the roll from the strapping apparatus.

Figure 8:
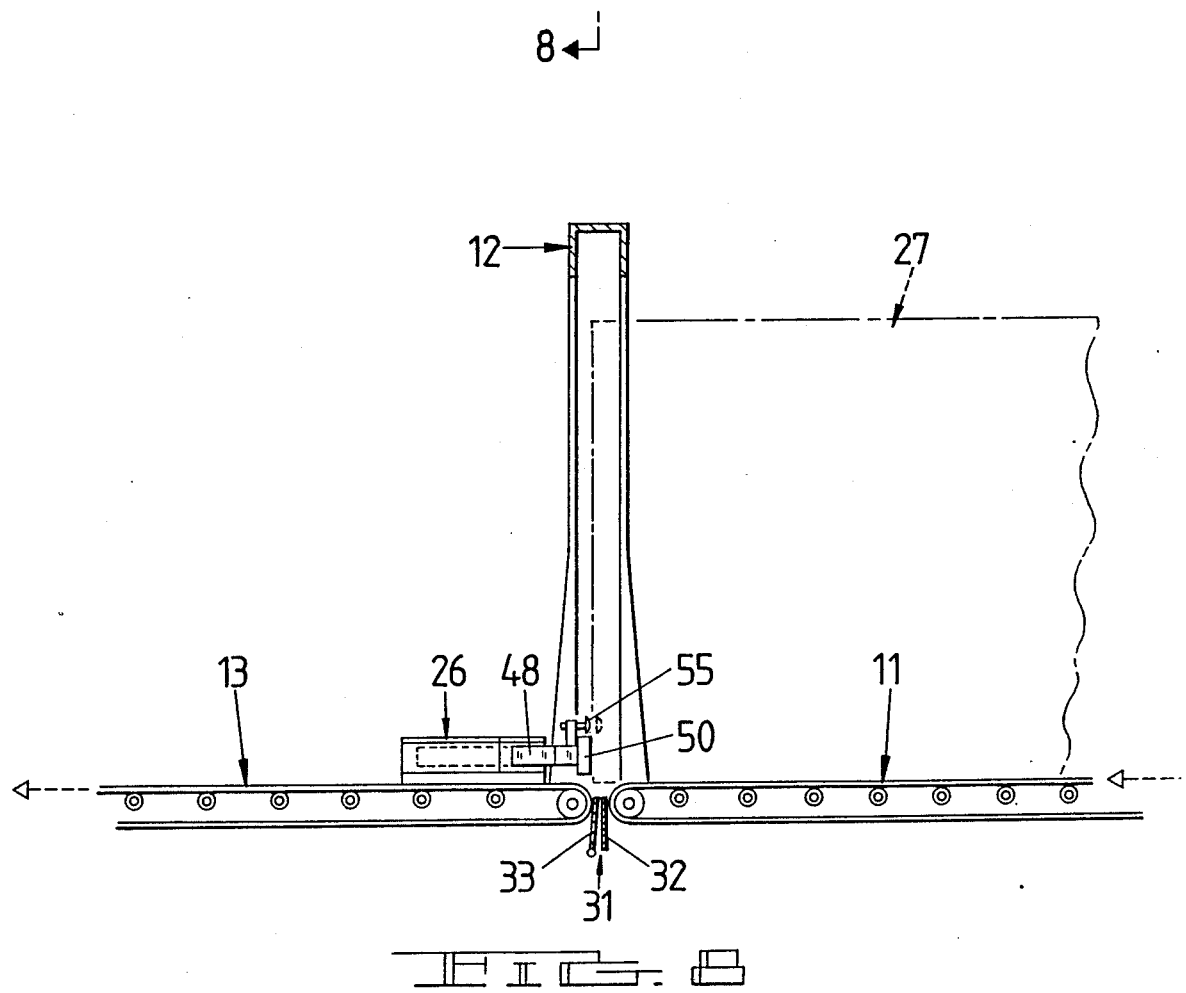
FIG. 8 is a detail side elevational view of the strapper status.

Referring to FIGS. 7 and 8 it can be seen that the strapper 12 is positioned at about the mid point between the input conveyor 12 and output conveyor 13. A band guide 31 is provided between these conveyors which comprises a fixed plate 32 and a hinged plate 33 which allows bands of various size to pass therebetween but which insure consistent placement of the band. Preferably the top of the band guide 31 will be only ⅛ inch below the roll 27 as it passes through the strapper 12, thus very little deviation in the band release from the guide will occur.

The stop assemblies 24 and 26, their cooperation and various parts are depicted in greater detail in FIG. 7–13. The stop assemblies are identical except that one is used to position the article upon delivery to the strapper 12 for placement of a forward band 39 and the other is used to position the article prior to discharge for placement of rear band 41, consequently the following description will apply to both stop assemblies 24 and 26. A base member 42 is affixed to the floor or structure adjacent the conveyor line and offset to one side thereof. The base member 42 supports a linear actuator 43 such as a pneumatic cylinder, a set of guide blocks 44 held at a slight elevation above the base member 42 by a set of spacers 46 or bushings, and a cover plate 47 affixed above the guide block 44. The cover plate 47 has an elongated slot 51 therein. An arm 48 is slidably mounted between the guide blocks 44 and has an upwardly extending fitting 49 affixed thereto which extends through the slot 51 to connect to linear actuator 43. Thus the fitting 49 is free to move through the slot 51. A pair of guide rollers 52 are mounted to the base member 42 and engage the sides of the arm 48 in opposition to the guide blocks 44 as shown in FIGS. 10 and 13. It may thus be seen that the arm 48 is mounted for linear movement in a plane above the floor and the conveyors 11 or 13. The free end of the arm 48 carries a contact block 50 which engages the article on the conveyor 11 or 13. Note that the base member 42 and extendable arm 48 are offset from the path of the conveyor thus the free end 53 of the arm 48 is configured to mount the contact block 50 such that the block 50 has a face 54 which is constantly aligned perpendicular to the line of travel of the conveyor. It is this face 54 which actually contacts the article. Also mounted on the free end of arm 48 is a limit switch 55 whIch detects the contact of the article with the block 50 and controls the actuation of the strapper 12. Note that the arm 48 is extended over the conveyor by the actuator 43 to position the contact block 50 relative to the band guide 31. The length of the arm 48 is fixed, therefore, to vary the actual positioning of the article relative to the band guide 31 and thus the position of the band relative to the edge of the article, the contact block 50 can be exchanged for a block having a different thickness.

It may be seen that the present invention can be used to modify existing conveyor systems to allow the precise positioning of articles thereon. Further when handling articles such as rolls of paper the positioning of the contact block 50 at a height above the conveyor ensures proper contact with the article. Additionally the use of the air motor allows the article to be held against the contact block 50 during performance of the strapping operation therefore no error is induced by the "rebound" of the article as can happen when an electric motor is braked to a stop. Thus we have provided a novel and superior positioning apparatus for use in the conveyor arts.

While we have shown our invention in various forms, it will be obvious to those skilled in the art that it is not so limited but is susceptible of various changes and modifications without departing from the spirit thereof.

What we claim is:

1. A method for accurately positioning an article on a driven conveyor relative to a fixed reference while performing an operation on said article comprising the steps of:
   (a) moving the article toward said reference point on a conveyor driven in a forward direction by a primary feed motor;
   (b) sensing the position of the article proximal said fixed reference;
   (c) reducing the speed of said conveyor;
   (d) diagonally extending a stop member from alongside said conveyor to a position above said conveyor to engage an article and stop the forward movement thereof at a predetermined point relative to said fixed reference;
   (e) sensing the engagement of an article with said stop member;
   (f) performing said operation response to engagement of said article with said stop member; and
   (g) releasing said article from said stop member for further movement on said conveyor;
   (h) sensing the position of said article at a second position relative to said fixed reference;
   (i) reversing the direction of said conveyor;
   (j) displacing a second stop member from alongside said conveyor to a position above said conveyor to engage said article and stop the reverse movement thereof at a second predetermined point relative to said fixed reference;
   (k) sensing the engagement of said article with said second stop member;
   (l) performing said operation responsive to engagement of said article with said second stop member;
   (m) and releasing said article for further movement on said conveyor in its original direction of travel.

2. The method of claim 1 wherein said conveyor urges said article against said stop during said performing step.

3. The method as defined in claim 2 wherein said operation is applying a strap about an article.

4. An improvement in an article strapping system wherein a series of articles are delivered to a strapping station and removed therefrom on a conveyor system comprising:
   (a) a driven feed conveyor which is forwardly driven by a primary feed motor;
   (b) a driven discharge conveyor which is forwardly driven by a primary discharge motor;
   (c) auxiliary drive means for driving said feed conveyor on said discharge conveyor responsive to the proximity of an article in relation to said strapping station wherein said auxiliary drive means drives said feed conveyor in a forward direction and drives said discharge conveyor in a reverse direction;
   (d) first stop means mounted for diagonal extension and retraction above said discharge conveyor for stopping the forward movement of an article on said feed conveyor at a specified position relative to said strapping station;

(e) second stop means mounted for diagonal extension and retraction above said feed conveyor for stopping the movement of an article in the reverse direction on said discharge conveyor relative to said strapping station.

5. The improvement of claim 4 wherein said auxiliary drive means comprises:
   (a) a first low speed air motor operatively connected to drive said feed conveyor responsive to the presence of an article proximal said strapping station;
   (b) first means for sensing the presence of an article at a predetermined position on said feed conveyor operatively connected to activate said first low speed air motor;
   (c) a second low speed air motor operatively connected to drive said discharge conveyor responsive to the presence of an article proximal said strapping station; and
   (d) second means for sensing the presence of an article at a predetermined position on said discharge conveyor operatively connected to actuate said second low speed air motor.

6. The improvement as defined in claim 5 wherein said first and second stop means each comprise:
   (a) a stop pad having a vertical face aligned perpendicular to the direction of movement of said articles;
   (b) an arm supporting said stop pad at a selected height above said conveyor system, said arm being slidably mounted for extension and retraction diagonally above said conveyor system; and
   (c) means for selectively extending and retracting said arm.

7. The improvement as defined in claim 6 further comprising means for sensing abutment of an article against said stop pad, having an output for actuating said strapping station.

8. The improvement as defined in claim 7 further comprising strap guide mounted between said feed conveyor and discharge conveyor at a fixed position with an upper edge proximal said article.

9. The improvement as defined in claim 5 further comprising clutch means for selectively engaging said first low speed air motor to drive said feed conveyor responsive to a signal from said first means for sensing.

10. The improvement as defined in claim 4 wherein said first and second stop means each comprise;
    (a) a stop pad having a vertical face aligned perpendicular to the direction of movement of said articles;
    (b) an arm supporting said stop pad at a selected height above said conveyor system, said arm being slidably mounted for extension and retraction diagonally above said conveyor system; and
    (c) means for selectively extending and retracting said arm.

11. The improvement as defined in claim 10 further comprising means for sensing abutment of an article against said stop pad, having an output for actuating said strapping station.

12. The improvement as defined in claim 1 further comprising means for sensing engagement of an article by said first stop means having an output for activating said strapping station.

13. The improvement as defined in claim 12 further comprising strap guide mounted between said feed conveyor and discharge conveyor at a fixed position with an upper edge proximal said article.

* * * * *